Nov. 8, 1966 M. F. KAMINSKY 3,284,715

ELECTRONIC CLOCK

Filed Dec. 23, 1963 2 Sheets-Sheet 1

INVENTOR.
MURRAY F. KAMINSKY
BY
Samuel Cohen
Attorney

INVENTOR.
MURRAY F. KAMINSKY
BY Samuel Cohen
Attorney

United States Patent Office 3,284,715
Patented Nov. 8, 1966

3,284,715

ELECTRONIC CLOCK

Murray F. Kaminsky, Philadelphia, Pa., assignor to Radio Corporation of America, a corporation of Delaware Filed Dec. 23, 1963, Ser. No. 332,583
7 Claims. (Cl. 328—41)

This invention relates to an improved circuit for measuring time. More specifically, the invention relates to an alternating current driven clock.

In the circuit of the invention, the successive cycles of the input alternating current of frequency L cycles per second are counted in alternate groups of M and N cycles each, until the total count is $(x+1)M+xN$, where $$\frac{(x+1)M+xN}{CL}=(2x+1)\frac{1}{R}$$

$1/R$ is the fraction of a particular time unit in which it is desired to measure the time, C is a conversion factor in seconds that particular time unit by which L must be multiplied to express L in said particular time units, and $x$, M and N are all integers. Each time this count $(x+1)M+xN$ is reached, the procedure is repeated. During the count to $(x+1)M+xN$, each time one of the alternate groups of M and N cycles is counted, the portion of the circuit which produces a count indicative of the number of fractions $1/R$ is actuated.

An important feature of the clock of the invention is that it measures time in intervals which are not integral multiples of the period of the alternating current driving the clock.

The invention is discussed in greater detail below and is shown in the following drawings of which:

FIGS. 1*a*–1*c* are block circuit diagrams showing the conventions employed in FIG. 2;

Figures 1A, 1B, 1C, 3, 4:
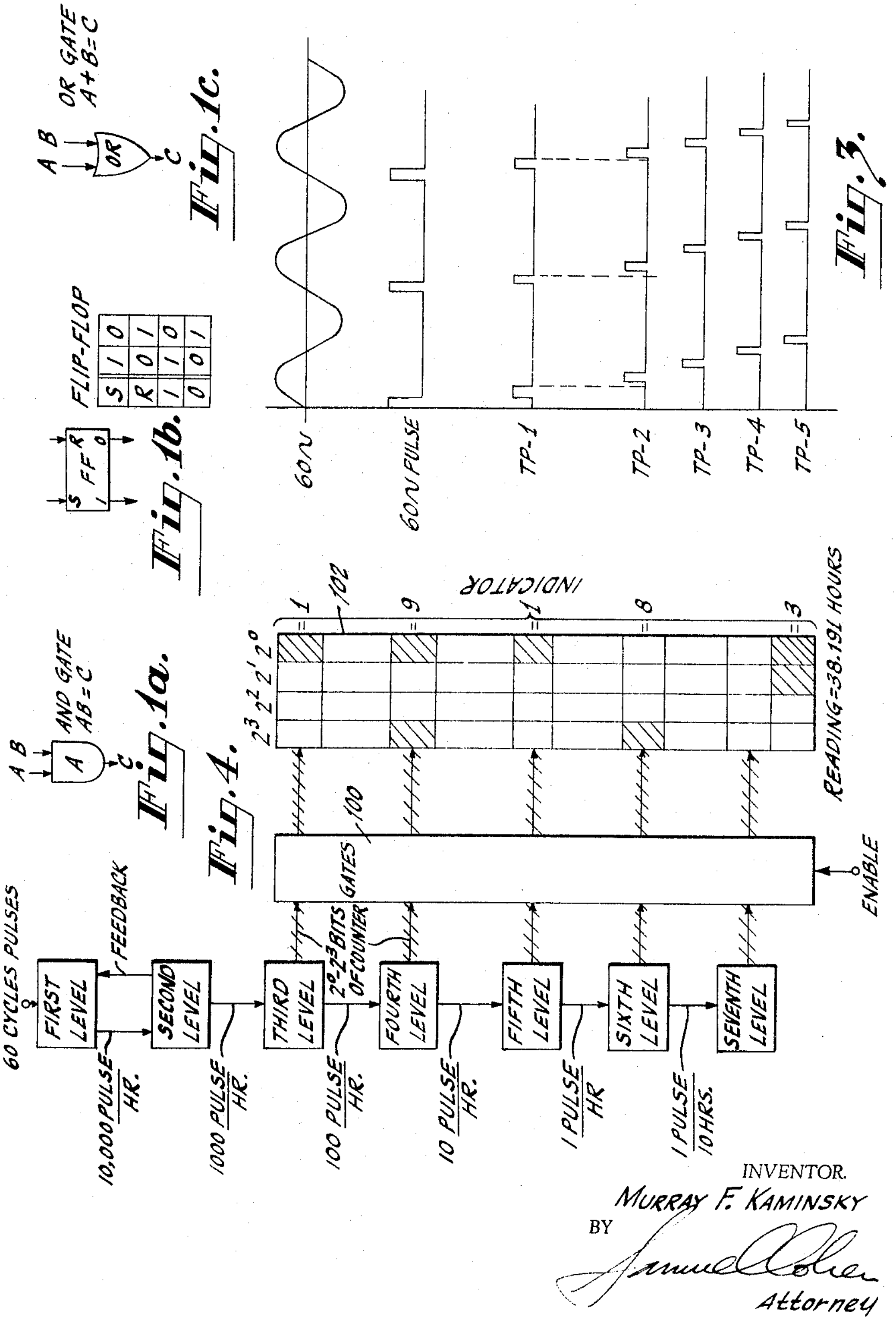
FIG. 3 is a drawing of waveforms present in the circuit of FIG. 2.
FIG. 4 is a block circuit diagram of an embodiment of the system of the invention showing how the elapsed time may be displayed.

The symbols of FIGS. 1*a*–1*c* are conventional. The Boolean equations next to the logic gates and the truth table next to the flip-flop illustrate the way in which the respective circuits operate.

Figure 2:
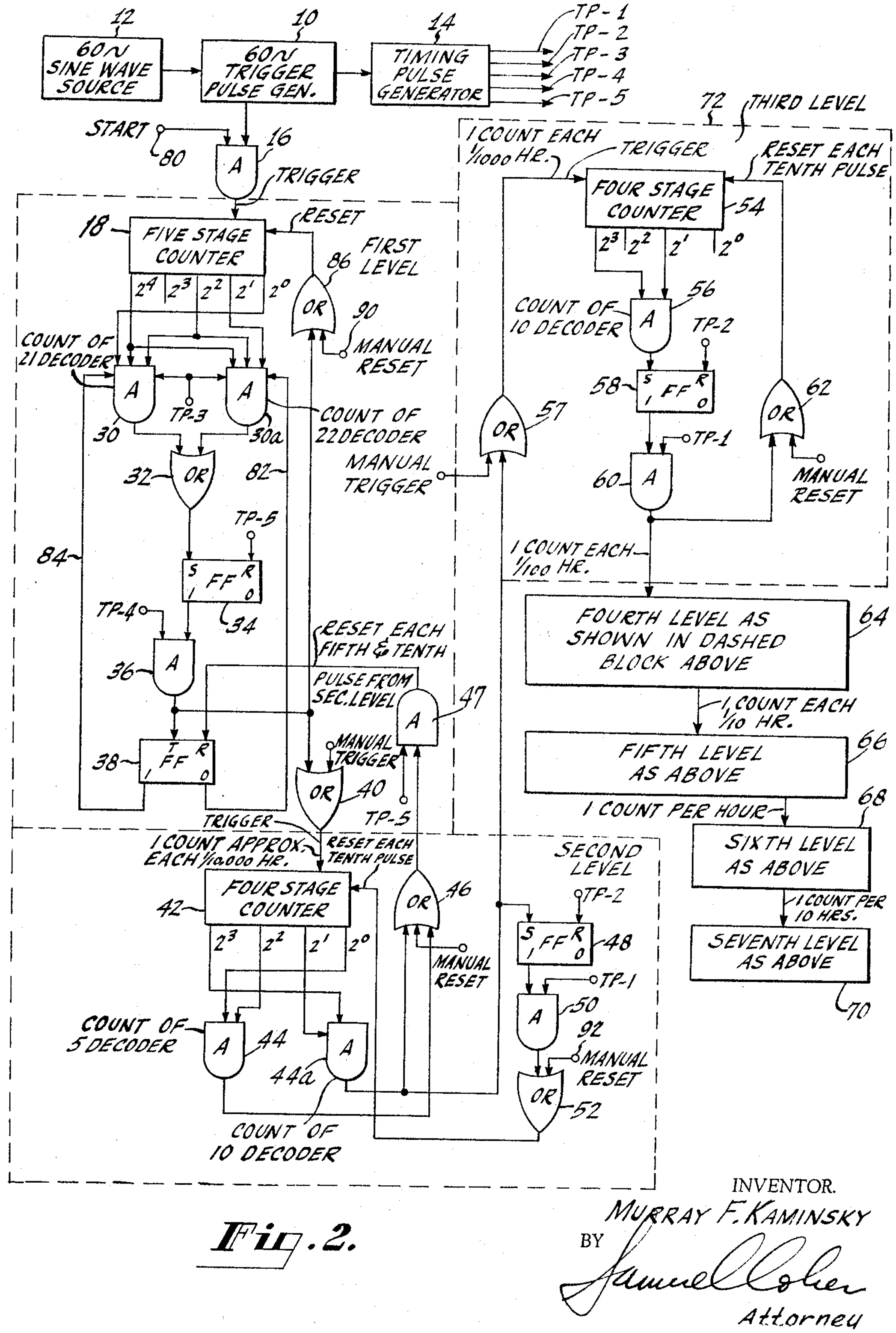
FIG. 2 is a block circuit diagram of one embodiment of the present invention.

The circuit of FIG. 2 includes a 60 cycle pulse generator 10 which is fed by a suitable 60 cycle (cycles/sec.) sine wave source, illustrated by block 12. The 60 cycle pulse generator may be a Schmidt trigger circuit, a blocking oscillator, clipping circuit, or any one of a number of other well known ways for translating a sine wave into spaced pulses. The trigger pulse generator 10 applies its output to the timing pulse generator 14 which produces five timing pulses TP–1 through TP–5 in response to each trigger pulse. The timing pulses may be the same duration and equally spaced from one another as shown in FIG. 3, however, neither one of these characteristics is essential to the operation of the system.

The 60 cycle trigger pulse generator 10 also supplies its output to the first level of a multiple level system of logic. In particular, the output is applied to an AND gate 16 which in turn is connected to a 5-stage binary counter 18. The latter is a well known circuit and may include five triggerable flip-flops. There are 5 output lines from the flip-flop, each carrying a signal indicative of a binary bit of different significance. These lines are legended $2^0$ through $2^4$ to represent the different bits.

The output of the counter is decoded by two AND gates 30 and 30*a*. AND gate 30 produces an output under certain conditions when the count is recorded by the counter is 21 (binary 10101). AND gate 30*a* produces an output under certain conditions when the count recorded by the counter is 22 (binary 10110).

The OR gate 32, which is connected to receive the output signals of AND gates 30 and 30*a*, applies a set signal to the flip-flop 34. The 1 output terminal of this flip-flop is connected to AND gate 36 which in turn is connected to the trigger terminal of triggerable flip-flop 38. The 1 outerput of the flip-flop 38 serves as a priming signal for AND gate 30 and the 0 output of the flip-flop serves as a priming signal for AND gate 30*a*.

The output of AND gate 36 is also applied through OR gate 86 to the reset terminal of counter 18. When reset, the counter produces a count binary 00000.

The output of AND gate 36 is also applied through OR gate 40 to the input terminal of a 4-stage counter 42 in the second level of logic of the system. The counter 42 may be made up of 4 triggerable flip-flops. The output of the counter 42 is decoded by two AND gates 44 and 44*a*. The former produces an output at a count of 5 (binary 0101) and the latter produces an output at the count of 10 (binary 1010). These outputs are applied through OR gate 46 and AND gate 47 to the reset terminal of flip-flop 38. The AND gate 47 is primed by timing TP–5.

The output of AND gate 44*a* is also applied as a set signal to flip-flop 48. The 1 output of this flip-flop is applied to AND gate 50 which in turn is connected to OR gate 52. The OR gate 52 applies a reset signal to the 4-stage counter 42.

The output of AND gate 44*a* is also applie via OR gate 57 as an input signal to the next 4-stage counter 54 in the third level of logic of the system. A count of 10 decoder-AND gate 56, receives the output of counter 54 and applies a set signal to flip-flop 58 when the count of 10 (binary 1010) is reached by the counter 54. The 1 output terminal of the flip-flop is connected to AND gate 60 and it in turn is coupled through OR gate 62 to the reset terminal of counter 54.

The remaining stages in the system are similar to stages already described. Thus, the stages in the fourth level, illustrated by block 64, the fifth level 66, the sixth level 68 and the seventh level 70, are all identical in arrangement to the stages within the third level of logic 72 of the system.

The purpose of the system of FIG. 2 is to measure time in decimal submultiples of an hour (hours/$10^T$, where T is an integer). But, the sine wave source 12 is a 60 cycle source and its period is not an integral decimal subjmultiple of an hour. For example $$1/10^4=1/10{,}000$$

of an hour, which is the smallest time interval of interest in the present application, is equal to 360 milliseconds. 360 milliseconds corresponds not to an integral number of periods of the 60 cycle wave but to 21.6 such periods. The system of the invention, by means of an ingenious method of approximation, translates integral numbers of periods of the 60 cycle wave, into hours/$10^T$, as explained in detail below.

In the operation of the system, a direct voltage level indicative of the binary digit (bit) one is applied to input terminal 80. This primes AND gate 16 and the AND gate produces output pulses at a frequency of 60 pulses per second. The 5-stage counter 18 counters these pulses. The flip-flop 38, which is assumed initially to be reset, applies a priming signal via lead 82 to the AND gate 30*a* and a disabling signal via lead 84 to the AND gate 30. When the counter 18 reaches a count of 22 (binary 10110), the $2^4$, $2^2$ and $2^1$ outputs of the counter all represent the bit one. Accordingly, when the timing pulse TP–3 occurs, AND gate 30*a* is enabled and applies an output signal via OR gate 32 to the set terminal of flip-flop 34.

The set flip-flop 34 applies a priming signal to AND gate 36. Therefore, when the next timing pulse TP–4 occurs, AND gate 36 becomes enabled and applies a trigger pulse through the OR gate 40 to the 4-stage counter 42 of the second level. The AND gate 36 also applies an output to the trigger terminal of flip-flop 38 changing the storage state of the flip-flop. When this occurs, the AND gate 30*a* becomes disabled and AND gate 30 becomes primed. At the same time, AND gate 36 applies its output through the OR gate 86 to the reset terminal of the 5-stage counter. This resets the count of the counter to 00000.

Summarizing the system operation up to this point, when the 5-stage counter 18 reaches the count of 22, the decoder AND gate 30*a* becomes enabled and sets the flip-flop 34. Then, the AND gate 36 resets the counter 18 in the first level, triggers the 4-stage counter 42 in the second level, and changes the storage state of flip-flop 38. The latter disables the count of 22 decoder and primes the count of 21 decoder. Shortly after the state of flip-flop 38 changes, the flip-flop 34 is reset by timing pulse TP–5.

The 5-stage counter 18 now begins again to count from 00000. When counter 18 reaches the count 21 (binary 10101), and TP–3 occurs, AND gate 30 is enabled and again sets flip-flop 34. The next timing pulse TP–4 which occurs causes the AND gate 36 to apply a second trigger pulse to the 4-stage counter and to reset the 5-stage counter 18 to 00000. The AND gate 36 also changes the storage state of flip-flop 38 and the latter diables AND gate 30 and primes AND gate 30*a*. The next timing pulse TP–5 again resets the flip-flop 34.

The operation above continues until the 4-stage counter 42 in the second level has reached a count of 5 (0101). At this time, the count of 5 decoder 44 becomes enabled and applies its output through OR gate 46 and at time TP–5 via AND gate 47 to the reset terminal of flip-flop 38. This causes the flip-flop 38, which had been placed in the set condition by the fifth pulse from AND gate 36, to be reset. Thus, during the time that the sixth group of pulses (the 109th through the 130th pulse) is counted by the 5-stage counter 18 of the first level, the AND gate 30*a* is primed and the AND gate 30 is disabled rather than the reverse being the case.

The AND gate 44*a* of the second level functions in a manner similar to that discussed above when the count of 10 occurs. At this time, the AND gate 44*a* applies a reset pulse through OR gate 46 and AND gate 47 to the flip-flop 38. This causes the AND gate 30*a* to be enabled during the time that the eleventh group of pulses is being counted by the 5-stage counter 18.

Summarizing the operation so far, the first level of the counter counts the input trigger pulses from generator 10 in 5 consecutive groups alternating between groups of 22 pulses and 21 pulses. In response to the first group of 22 pulses, the AND gate 36 produces a single output pulse. In response to the second group (only 21 pulses) AND gate 36 produces a second output pulse, and so on until the 5 groups of pulses (22, 21, 22, 21, 22=108 pulses) are counted. After the first 5 groups of pulses are counted, the 4-stage counter 42 feeds back a reset signal to the flip-flop 38 so that the number of pulses counted in the sixth group is 22 rather than 21. In the seventh group, 21 pulses are counted; in the eighth group 22; in the ninth group 21; in the tenth group 22; in the eleventh group again 22 pulses rather than 21 are counted because of the reset signal fed back from the count of 10 decoder in the second level.

The result of all of the above is illustrated in the following table. The first count is of 22, of the 60 cycle inputs. However, only 21.6 pulses occur in $\frac{1}{10,000}$ of an hour. Therefore, the first count is in error an amount of +0.4 of a period of a 60 cycle wave (approx. $+6.67 \times 10^{-3}$ sec.). The second count is of a group of 21 pulses. The error here is −0.6 of a period. Therefore, after 2 pulses the net error is only −0.2 of a period. After 5 groups of 60 cycle pulses (a total of 108 such pulses), the net accumulated error is zero since the accumulated positive error which is +1.2 periods of a 60 cycle wave is exactly equal to the accumulated negative error of −1.2 periods of a 60 cycle wave. The percentage of error in the total count fluctuates between positive and negative values but, as the number of pulses counted increases, approaches closer and closer to zero.

| A<br>Count Produced by First Level | B<br>Time Between Successive Pulses in 1/60 Secs. | C<br>B–21.6 | D<br>accumulated Error in 1/60 Sec. | E<br>Percentage Error in Total Count |
|---|---|---|---|---|
| 1 | 22 | +0.4 | +0.4 | +1.9 |
| 2 | 21 | −0.6 | −0.2 | −0.5 |
| 3 | 22 | +0.4 | +0.2 | +0.3 |
| 4 | 21 | −0.6 | −0.4 | −0.5 |
| 5 | 22 | +0.4 | 0 | 0 |
| 6 | 22 | +0.4 | +0.4 | +0.3 |
| 7 | 21 | −0.6 | −0.2 | −0.1 |
| 8 | 22 | +0.4 | +0.2 | +0.1 |
| 9 | 21 | −0.6 | −0.4 | −0.2 |
| 10 | 22 | +0.4 | 0 | 0 |

Returning to the system of FIG. 2, the pulses applied to the 4-stage counter 42 occur at a frequency of 10,000 pulses per hour. The count of 10 decoder AND gate 44*a* produces an output pulse in response to each 10 input pulses to the 4-stage counter 42. This output pulse therefore occurs at a frequency of 1,000 pulses per hour. This output pulse is applied as a set pulse to the flip-flop 48. When timing pulse TP–1 occurs, AND gate 50 becomes enabled and applies its output through OR gate 52 to reset the 4-stage counter 42 to 00000.

The third level of logic operates similarly to the second level of logic and need not be discussed in great detail. Each time the count of ten decoder 44*a* in the second level of logic is activated it supplies a pulse through OR gate 57 to the four stage counter 54. The count of 10 decoder AND gate 56 in the third level of logic produces an output pulse in response to each 10 input pulses to the 4-stage counter 54. This pulse sets flip-flop 58 which applies a priming signal to AND gate 60. When the primed AND gate is activated in response to TP–1, its output resets the 4-stage counter 54 to 0000 and applies an input to the fourth level 64. The remaining stages operate in the same way, each producing a count at a rate of 0.1 that of the preceding stage. Thus, the fourth level produced 10 counts an hour; the fifth level 1 count per hour; the sixth level 1 count per 10 hours.

The purpose of the various timing pulses of FIG. 2 is believed to be self-evident. Initially, all of the counters and flip-flops are reset. The timing pulse TP–1 is applied to AND gates such as 50 and 60 of the various logic levels. When the gates to which the TP–1 pulses are applied become enabled, the 4-stage counters to which these gates are connected are reset. The timing pulses TP–2 reset the flip-flops immediately ahead of the AND gates above. Thus, in the second level of logic the timing pulses TP–2 reset flip-flop 48.

The timing pulses TP–3 prime the decoder AND gates such as 30 and 30*a* in the first level of logic. The timing pulses TP–4 prime AND gates such as 36 in the first level of logic. Timing pulses TP–5 reset the flip-flop 34, in the first level of logic.

The purpose of various timing pulses is to insure that each stage has settled down to a stable state or condition before it is called upon to perform some function. Thus, for example, the timing pulse TP–5 resets flip-flop 34 during one cycle of the timing pulses. Somewhat less than $\frac{1}{60}$ of a second later, timing pulse TP–3 occurs.

It primes the AND gates 30 and 30*a* and each of them, when in condition to operate, produces an output which sets the flip-flop. At this time, the flip-flop is already fully settled down to its reset condition. Shortly after pulse TP–3, pulse TP–4 enables the AND gate 36. At this time, the flip-flop 34 is fully settled down to its set or reset condition, as the case may be.

It is sometimes desirable in the operation of a time measuring system, such as shown in FIG. 2, to be able manually to reset the various counters. This can be done by applying manual reset voltages to the various reset terminals. For example, 5-stage counter 18 may be reset by applying a voltage to terminal 90 through OR gate 86 to the reset terminal. The 4-stage counter 42 may be reset by applying a reset voltage to terminal 92 and through OR gate 52 to the reset terminal of the counter 42. In addition, the flip-flop 38 can be reset manually by an appropriate voltage applied through OR gate 46.

The terminals of the system of FIG. 2, which are legended "manual trigger," are for the purpose of permitting the count stored to be set to any desired level. The input to the manual trigger terminal is from a source of voltage in series with a switch. Each time the switch is actuated, a pulse is applied through the OR gate to the trigger terminal of a counter. It is thus possible manually to advance the count of the second, third and all higher levels of logic in the system. A manual trigger terminal is shown connected to OR gate 40 and another is shown connected to OR gate 57. The 4th through 7th levels of logic have similar manual trigger terminals.

The elapsed time measured by the system shown in FIG. 2 may be indicated by means of an incandescent or neon lamp, or other light emitting element. FIG. 4 shows an arrangement in which the third through sixth levels of the system supply their counter outputs through gates 100 to the indicator 102. The indicator may include 4 light emitting elements for each 4-stage counter. These elements are shown as rectangles in the figure and those elements which are energized are cross-hatched. Each element is connected to the output of a different flip-flop in each counter. For example, the $2^0$ element of the counter of the third level is connected to the $2^0$ flip-flop, the $2^1$ element of the counter of the third level is connected to the $2^1$ flip-flop of the third level, and so on.

The number displayed by the indicator is in binary form. If desired, a direct reading decimal indicator which is actuated by binary inputs can be used instead of the one shown. Such indicators are well known.

In addition to indicating the measured time, it is often desired to store this information in the memory of a computer (not shown) with which the system may be associated. This may be done by gating the elapsed time information into a storage register in the computer and from that register into the computer memory.

While in the embodiment of the invention illustrated, the input wave is at 60 cycles, and the output is measured in terms of hours, tenths of hours, hundredths of hours, thousandths of hours and so on, it should be appreciated that other parameters may be employed. Moreover, while in the present system two different groups of pulses are counted in alternate groups, in certain circuits it may be more desirable to count 3, 4 or 5 different groups of pulses. Whatever the system, the general principle applies that the accumulated error in the measurement of elapsed time should periodically become equal to zero. also, the group of pulses chosen should preferably occupy a time interval which is fairly close to that of the smallest fraction of time it is desired to measure. This insures that the error in time measurement, at any instant, will not be very large. The specific arrangement chosen in any case depends upon the frequency of the input signal and the units in which it is desired to measure and indicate the elapsed time.

Generalizing the 2 group counter system, the first level counts groups of M and N cycles until the total count is $yM+xN$, where $$\frac{yM+xN}{CL}=(y+x)\frac{1}{R}$$

In this equation, $1/R$ is a fraction of a given time unit, C is a known conversion factor, and all other letters are integers. It is preferable, but not essential, that the groups of M and N be counted alternately. In the case of alternate counts, $y=x+1$ or $x-1$. However, if the groups of M and N pulses are not counted alternately, $y$ and $x$ need not necessarily be related in this way. It is only necessary that the equation above be satisfied. In the specific solution given by way of illustration:

$L=60$ cycles/sec.
$1/R=10^{-4}$ hours
$C=3600$ seconds/hour
$M=22$ cycles
$N=21$ cycles
$x=2,\ y=3$ Substituting these values in the equation gives:

$$\frac{(3)22\text{ cycles}+(2)\ 21\text{ cycles}}{\left(3600\ \frac{\text{seconds}}{\text{hour}}\ 60\ \frac{\text{cycles}}{\text{second}}\right)}=(2+3)10^{-4}$$

hours. There are other values of M, N, $x$ and $y$ which can be found to satisfy the equation, however, the solution given is an especially desirable one for the particular parameters L and R chosen.

What is claimed is:

1. Apparatus for deriving from an L cycle per second input signal a measurement in fractions $1/R$ of a particular time unit, where L and R are integers, and C is a known factor in seconds/particular time unit, by which L is multipled to express L in said particular time units, comprising:

(a) means for counting the cycles in groups of M and N cycles each until $yM+xN$ cycles have been counted, where $x$, $y$ M and N are integers, and where $M/CL$ differs in one sense from $1/R$, $N/CL$ differs in an opposite sense from $1/R$, and $$\frac{yM+xN}{CL}=\frac{x+y}{R}$$

(b) means for producing, in response to each group of cycles counted, an output signal which may be counted; and (c) means including the means of (a) above for, repeating the counting of groups of cycles in responsive to each $x+y$ such output signals.

2. Apparatus for deriving from an L cycle/second input signal a measurement in fractions $1/R$ of a particular time unit, where L and R are integers, and C is a known factor in seconds/particular time unit, by which L must be multiplied to express L in said particular time units, comprising:

(a) means for counting the cycles in alternate groups of M and N cycles each until $(x+1)M+xN$ cycles have been counted, where $x$, M and N are integers, and where $M/CL$ differs in one sense from $1/R$, $N/CL$ differs in an opposite sense from $1/R$, and $$\frac{(x+1)M+xN}{CL}=\frac{2x+1}{R}$$

(b) means for producing, in response to each group of cycles counted, an output signal which may be counted; and (c) means including the means of (a) above for, repeating the counting of alternate groups of cycles in response to each $2x+1$ such output signals.

3. Apparatus for deriving from an L cycle/second input signal a measurement in fractions $1/10^T$ of an hour, where L and T are integers, comprising:

(a) means for counting the cycles in alternate groups of M and N cycles each until $(x+1)M+xN$ cycles have been counted, where $x$, M, and N are integers, and where $M/3600L$ differs in one sense from $1/10^T$, $N/3600L$ differs in an opposite sense from $1/10^T$, and $$\frac{(x+1)M+xN}{3600L}=\frac{2x+1}{10^T}$$

(b) means for producing, in response to each group of cycles counted, an output signal which may be counted; and (c) means including the means of (a) above for, repeating the counting of alternate groups of cycles in response to each $2x+1$ such output signals.

4. Apparatus for deriving from a 60 cycle/second input signal, a measurement of time in decimal submultiples of hours comprising:

means for counting the cycles in successive groups of 22, 21, 22, 21, 22, until 108 such cycles have been counted;

means for producing, in response to each group of cycles counted, an output pulse which may be counted; and means responsive to each five such output pulses for causing the means for counting to repeat the counting of successive groups of said 60 cycle pulses, as indicated above.

5. A system for measuring time in units $1/R$ hours and which is powered by an L cycle per second alternating current source, where L and R are integers, comprising, in combination:

a binary counter for counting successive cycles of said alternating current;

two decoders connected to the counter, one for producing an output in response to a count of M cycles and the other for producing an output in response to a count of N cycles, where M and N are integers, and where $M/3600L$ differs in one sense from $1/R$ and $N/3600L$ differs in an opposite sense from $1/R$;

two state means coupled to the decoders for disabling one decoder and priming the other when in one state and responsive to an output from the primed decoder, for changing its state, and thereby disabling the primed decoder and priming the other decoder, whereby the decoders alternately produce outputs after successive groups of M and N pulses;

a second binary counter coupled to said decoders for counting the outputs thereof;

and decoder means coupled to the second binary counter for producing an output after the count $2x+1$ and integral multiples thereof, and applying that output to said two-state means for changing the latters state, where $x$ is an integer, and $$\frac{2x+1}{R}=\frac{(x+1)M+xN}{3600L}$$

6. A system for measuring time in $1/10^T$ given time units and which is powered by an L cycle per second alternating current source, where L and T are integers, and C is a known factor in seconds/given time unit by which L must be multiplied to express L in said given time units, comprising, in combination:

a binary counter for counting successive cycles of said alternating current;

two decoders connected to the counter, one for producing an output in response to a count of M cycles and the other for producing an output in response to a count of N cycles, where M and N are integers, and where $M/CL$ differs in one sense from $1/10^T$ and $N/CL$ differs in an opposite sense from $1/10^T$;

two state means coupled to the decoders for disabling one decoder and priming the other when in one state and responsive to an output from the primed decoder, for changing its state, and thereby disabling the primed decoder and priming the other decoder, whereby the decoders alternately produce outputs after successive groups of M and N pulses;

a second binary counter coupled to said decoders for counting the outputs thereof;

and decoder means coupled to the second binary counter for producing an output after each count $2x+1$, and applying that output to said two-state means for changing the latters state, where $x$ is an integer, and $$\frac{2x+1}{10^T}=\frac{(x+1)M+xN}{CL}$$

7. A system for measuring time in intervals of $10^{-4}$ hours and which is powered by a 60 cycle per second alternating current source, comprising, in combination:

a five-stage binary counter for counting successive cycles of said alternating current;

two decoders connected to the counter, one for producing an output in response to a count of 22 cycles and the other for producing an output in response to a count of 21 cycles;

a triggerable flip-flop coupled to the decoders and changing its storage state in response to an output from either decoder for disabling the 21 cycle decoder and priming the 22 cycle decoder when in its initial storage state, and for disabling the 22 cycle decoder and priming the 21 cycle decoder, when in its second storage state;

a four-stage second binary counter coupled to said decoders for counting the outputs thereof;

and decoder means coupled to the second binary counter for producing an output in response to each fifth input pulse thereto, and applying that output to said triggerable flip-flop for changing the latters state.

References Cited by the Examiner

UNITED STATES PATENTS

| | | | |
|---|---|---|---|
| 2,410,156 | 10/1946 | Flory | 58—26 |
| 2,970,226 | 1/1961 | Skelton et al. | 307—88.5 |
| 3,194,003 | 7/1965 | Polin | 58—50 |
| 3,195,011 | 7/1965 | Polin | 315—84.6 |

ARTHUR GAUSS, *Primary Examiner.*

S. D. MILLER, *Assistant Examiner.*